March 27, 1956
L. W. HERCHENROEDER ET AL
2,740,078
CURRENT LIMIT AND INERTIA COMPENSATION APPARATUS Filed July 29, 1953

United States Patent Office 2,740,078
Patented Mar. 27, 1956

2,740,078

CURRENT LIMIT AND INERTIA COMPENSATION APPARATUS

Louis W. Herchenroeder and Martin H. Fisher, Pittsburgh, Pa., assignors to Westinghouse Electric Corporation, East Pittsburgh, Pa., a corporation of Pennsylvania Application July 29, 1953, Serial No. 370,995

22 Claims. (Cl. 318—6)

This invention relates to electrical control systems and more particularly to magnetic amplifier regulated electrical control systems for variable voltage drives.

Present production requirements in industry dictate that electrical drive systems operate at high speeds and high rates of acceleration and retardation. In order to achieve the required speeds and rates of acceleration and retardation, it is necessary to work the electrical equipment at its maximum capacity. When working the electrical equipment to its maximum capacity, a current limit control is desirable.

In applications of the electrical drive system where the drive motor is used to drive a take-up reel or a wind-up roll, such as is used in modern paper making, it is necessary to change the speed of a load having a variable inertia (i. e. the inertia varies with the amount of material on the coil) and keep a constant tension in the strip of material. To accomplish this result, a core type unwind stand, which is mechanically coupled to drive an unwind braking generator, is provided. Armature current of the unwind braking generator sets the tension in the strip when the system is run at a constant speed. During a change of speed, however, the tension in the strip depends not only on the armature current of the unwind braking generator, but also upon the torque necessary to change the rate of speed of the unwind roll or reel and the unwind braking generator. Thus, in order to maintain the desired tension in the strip, the armature current of the braking generator must be reduced during acceleration and increased during retardation; this is called inertia compensation. Stated in another way, inertia compensation is the recalibration of the armature current regulator for the unwind generator by an amount necessary to accelerate or retard the windup reel motor and its load.

It is one object of this invention to provide a variable voltage drive system which utilizes saturable core reactor devices.

Another object of this invention is to provide a variable voltage electrical drive system having loop current limit control.

A further object of this invention is to provide a generator fed motor drive for paper rolls and the like including loop current limiting means and means for compensating for the effect of roll inertia when accelerating and decelerating the paper strip being fed.

A more specific object of this invention is to provide a variable voltage drive system which utilizes saturable core reactor devices to give a current limit control and for applying and removing inertia compensation.

Other objects and advantages of this invention will become more apparent from a study of the following specification and accompanying drawings in which.

Figure 1:
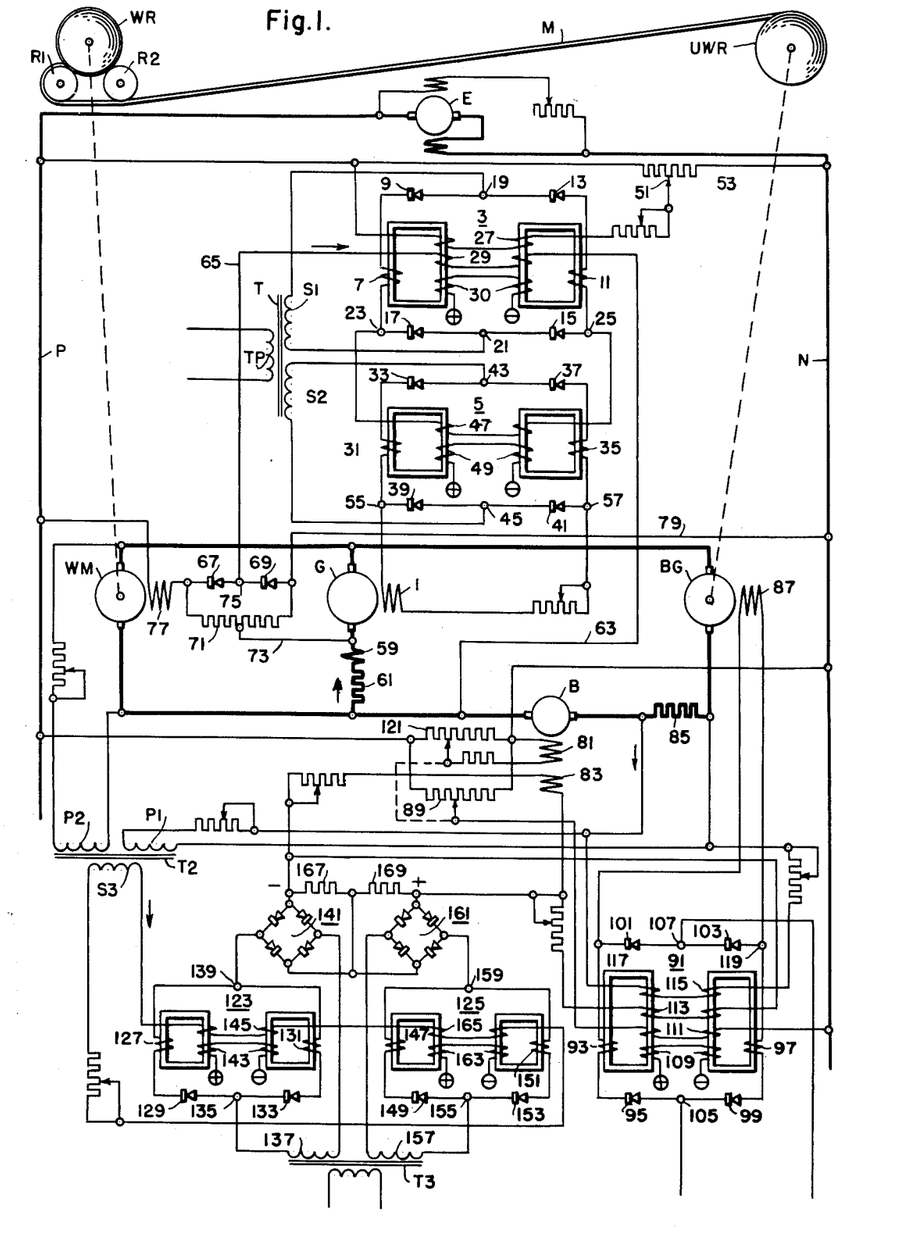
Figure 1 illustrates diagrammatically one embodiment of the invention as applied to and combined with a winder and slitter drive, and Fig. 2 diagrammatically illustrates another embodiment of the invention as applied to and combined with a winder and slitter drive.

The winder drive system consists of a windup reel WR which is used to take up the strip of material M and which is driven by a winder motor WM. The material M is taken from an unwind reel UWR which is mechanically coupled to the rotor of the braking generator BG. The system is shown with two drums R1 and R2 supporting the windup reel WR. The system shown is obviously only one of many arrangements which might be used. A main generator G is connected in a loop circuit with the armature of the winder motor WM to supply the armature voltage for the motor. A main exciter E is shown for supplying the system voltage, namely, the voltage on buses P and N. The voltage of the main generator G determines the speed of the winder motor WM, and the output voltage of the main generator is determined by the excitation of its field winding 1. The magnetic amplifiers 3 and 5 control the excitation of the field winding 1 of the main generator G and are used both as a voltage control for the field winding and for current limit in the loop circuit which contains the armature of the winder motor WM in parallel with the braking generator armature BG and the armature of the main generator G.

The magnetic amplifier 3 has its circuits connected in full-wave bridge arrangement. That is, it has its main winding 7 connected in series with saturating rectifier 9 to form one leg of the bridge, and its main winding 11 connected in series with the saturating rectifier 13 to form an adjacent leg of the bridge arrangement and the load rectifiers 15 and 17 form the remaining two legs of the bridge arrangement. The terminals 19 and 21 are the A.-C. power input terminals to the bridge circuit and the terminals 23 and 25 are the output terminals of the bridge arrangement. The magnetic amplifier 3 is provided with control windings 27, current limit control windings 29, and biasing windings 30. The input terminals 19 and 21 of the magnetic amplifier 3 are connected across the secondary winding S1 of a transformer T having its primary winding TP supplied by an alternating current source.

The second-stage magnetic amplifier 5 is also shown with its circuits connected in a full-wave bridge arrangement. Its main winding 31 is connected in series with the saturating rectifier 33 to form one leg of the bridge arrangement, and its main winding 35 is connected in series with the saturating rectifier 37 to form the adjacent legs of the full-wave bridge arrangement. The remaining two legs of the bridge are formed by the load rectifiers 39 and 41. The input terminals 43 and 45 of the magnetic amplifier 5 are connected across the secondary S2 of the transformer T. The magnetic amplifier 5 has a set of control windings 47 which are connected across the output terminals 23 and 25 of the magnetic amplifier 3, and a set of biasing windings 49 which are connected to a suitable source of direct current for setting the point of operation of the magnetic amplifier 5.

The voltage reference control windings 27 for the magnetic amplifier 3 are connected between the positive bus P and the tap 51 on the speed selecting potentiometer 53. It will be seen that the voltage on the speed selecting control windings 27 set by the position of the arm on the speed selecting potentiometer 53 will determine the output of the magnetic amplifier 3 and, consequently, the output of the second-stage magnetic amplifier 5. Since the field winding 1 of the main generator G is connected between the output terminals 55 and 57 of the second-stage magnetic amplifier 5, its voltage will be determined by the voltage tapped from the speed selecting potentiometer 53 and, as a consequence, the voltage across the armature of the winder motor WM and its speed will also be set.

A commutating winding 59 and an impedance 61 are connected in the loop circuit which contains the armatures of the main generator G and the winder motor WM in parallel with a circuit which contains the braking generator armature BG. The current limit control winding 29 of the magnetic amplifier 3 is connected in a series circuit which is connected across the impedance which comprises the commutating winding 59 of the main generator G and the impedance 61. The series circuit of the current limit control winding comprises the conductor 63, current limit control windings 29, conductor 65, the parallel circuit which contains the rectifiers 67 and 69 and the center tapped impedance 71, and the conductor 73. The rectifiers 67 and 69 are connected in series with each other and are poled in the same sense, but the conductor 65 is connected to the terminal 75 between the rectifiers 67 and 69 so that the rectifiers are poled in opposite senses with respect to a current flowing in the conductor 65.

The parallel combination of the rectifiers 67 and 69 in series and the center tapped impedance 71 is connected in series circuit from the positive bus P through the field 77 of the winder motor WM, through the parallel combination of rectifiers 67 and 69 and the impedance 71, the conductor 79 to the negative bus N. The rectifiers 67 and 69 are poled in such a manner that the current flowing in the series circuit just described must all flow through the impedance 71.

If the drive is accelerating and current is flowing through the commutating field 59 of the main generator G and the impedance 61 in the direction shown, a current would be circulated through the current limit control windings 29, if the IR drop across the commutating winding 59 of the main generator G and the impedance 61 exceed one half of the IR drop of the center tapped impedance 71. The current through the current limit control winding 29 would be in such a direction as to oppose the effect of the speed selecting control windings 27 and decrease the output of the magnetic amplifier 3. That is, the current flowing through the speed selecting control windings 27 tends to saturate the cores of the magnetic amplifier 3, and current flowing in the circuit of the current limit control winding 29 in the direction indicated by the arrow has the effect of desaturating the cores of the magnetic amplifier 3. Thus, a current flowing in a loop of the armature of the main generator G and the winder motor WM which exceeds the current limit value will cause current to flow through the current limit control winding 29 of the magnetic amplifier 3 which will decrease the output of the magnetic amplifier 3 and thus decrease the excitation of the field winding 1 of the main generator G, and in consequence decrease the voltage supplied by the main generator G to regulate the current in the loop circuit which contains the armatures of the main generator G and the winder motor WM.

If the system is to be retarded rapidly and the excitation of the speed selecting control windings 27 is removed entirely, as by shifting tap 51 to the left so as not to bridge any sections of potentiometer 53, the current in the impedance 61 and the commutating field 59 of the main generator G will be reversed from the direction shown. When the IR drop in the commutating winding 59 and the impedance 61 exceeds one half of the IR drop across the impedance 71, the current will flow through the current limit control winding loop in a direction opposite that which is shown and regenerative braking with current limit is accomplished. The current through the current limit control winding 29 under the conditions recited will be in such a direction as to increase the saturation of the cores of the magnetic amplifier 3 and thereby, increase the output of the magnetic amplifiers 3 and 5 and the excitation of the field winding 1 of the main generator G. Of course, as the speed of the system is reduced, the regenerative current will be reduced until the voltage across the commutating field 59 of the main generator G and the impedance 61 is less than one half the IR drop across the impedance 71, and the current limit will no longer be in effect.

Since it is desirable to maintain a constant tension in the strip of material M during acceleration and deceleration of the system, the braking generator BG and a booster generator B are provided. The booster generator is connected in series with the braking generator BG and has its field windings 81 and 83 excited in such a manner as to supply a voltage equal to the IR drop in the circuit of the armature of the braking generator BG at all times. The braking generator BG is mechanically coupled to the unwind reel UWR to provide braking for the unwind reel and the desired tension in the strip of material M. The armatures of the unwind braking generator BG and the booster generator B are connected in shunt with the armatures of the winder motor WM and main generator G.

When the system is run at constant speed, the unwind reel UWR is rotated at a speed which varies as a function of the diameter of the reel. That is, as the material is taken from the unwind reel UWR, its speed of rotation increases. Since the speed of rotation of the unwind braking generator BG varies with the speed of the unwind reel UWR, the current in the armature circuit of the unwind braking generator BG would also vary if the excitation of the field 87 for the unwind braking generator BG remained constant. Therefore, a current regulating scheme is provided to regulate the current in the armature circuit of the braking generator BG. A tension adjusting potentiometer 89 is connected between the buses P and N to determine the magnitude of the current in the armature circuit of the unwind braking generator BG which the current regulator is to maintain and, thus, the tension adjusting potentiometer 89 determines the tension in the strip of material M.

The regulating means for the current in the armature circuit of the unwind braking generator BG comprises the magnetic amplifier 91 which has its circuits connected in full-wave bridge arrangement. The magnetic amplifier 91 has its main winding 93 connected in series with the saturating rectifier 95 to form one leg of the full-wave bridge arrangement and its main winding 97 connected in series with the saturating rectifier 99 to form an adjacent leg of the full-wave bridge. The remaining two legs of the full-wave bridge are formed by the load rectifiers 101 and 103. The input terminals 105 and 107 are supplied from an alternating current source. The magnetic amplifier 91 has a set of biasing windings 109 to set the point of operation of the magnetic amplifier, a set of tension adjusting control windings 111, a set of inertia compensating control windings 113, and a set of current or tension measuring control windings 115. The output terminals 117 and 119 are connected to furnish the excitation for the field winding 87 of the braking generator BG. The biasing windings 109 are energized such that the braking generator BG will never lose its excitation.

The tension reference control winding 111 is supplied from the tension reference voltage potentiometer 89 and the current flowing through the tension reference control winding 111 is in such a direction as to saturate the cores. Thus, the tension reference voltage potentiometer 89 sets the output of the magnetic amplifier 91 and the excitation of the field winding 87 for the braking generator BG and, as a consequence, the braking power of the unwind braking generator BG and the tension in the strip of material M.

The current or tension measuring control windings 115 for the magnetic amplifier are connected across the impedance 85 which is in the series circuit of the armature of the unwind braking generator BG. As the material M is unwound from the unwind reel UWR and the speed of the unwind reel and the armature of the braking generator BG increases, the current through the impedance 85 tends to increase and, consequently, the current through the current control windings 115 tend to increase in the direction shown. The current control windings 115 are so wound on the cores that a current in the direction shown opposes the effect of the tension reference control windings 111 and decreases the saturation of the core to decrease the output of the magnetic amplifier 91 and, thus, reduce the excitation on the field winding 87 of the braking generator BG. A rate of reduction of the excitation of the field winding 87 is such that it maintains the desired current in the armature of the braking generator BG as the diameter of the reel decreases and the speed of the rotation of the rotor increases to maintain a constant braking effect and thereby a constant tension in the strip of material M.

It may be seen that the fixed field 81 for the booster generator B derives its excitation from the potentiometer 121 which is ganged to the tension reference voltage potentiometer 89. The potential tapped from the potentiometer 121 is such that the booster generator B will produce a voltage equal to the IR drop in the armature circuit of the braking generator BG.

During acceleration or deceleration of the system, tension in the strip of material M depends not only on the armature current of the unwind braking generator BG, but also upon the torque necessary to change the rate of speed of the unwind roll UWR and the unwind braking generator BG. Thus, in order to reduce the current of the unwind braking generator BG during acceleration of the system and to increase the current of the unwind braking generator BG during deceleration of the system to maintain a constant tension on the strip of material M, a control signal which is indicative of the inertia must be provided to give inertia compensation.

The inertia compensation signal is obtained by placing a set of primary windings P1 of the transformer T2 across the impedance 85, which is in series with the armature circuit of the unwind braking generator BG, and placing a second set of primary windings P2 of the transformer T2 across the series circuit which contains the armatures of the unwind braking generator BG and the booster generator B. Thus, the voltage across the set of primary windings P1 is determined by the current in the armature circuit of the unwind braking generator BG, and the voltage across the set of primary windings P2 is determined by the voltage across the series circuit of the armature of the unwind braking generator BG. The voltage across both sets of primary windings P1 and P2 is a direct current voltage which, under normal conditions, should be constant and, therefore, no voltage will appear across the secondary winding S3 of the transformer T2. If, however, the speed of the system is varied, there will be a change of current in the circuit of the armature of the unwind braking generator BG and a change of voltage across that circuit. The output of the transformer T2 then is responsive to the rate of change of current and/or voltage in the circuit of the armature of the unwind braking generator BG.

A pair of magnetic amplifiers 123 and 125 are provided to receive and amplify the inertia compensating control signal. The magnetic amplifiers 123 and 125 have their circuits connected in doubler arrangement. The power source for the magnetic amplifiers is shown as a transformer T3 having a divided secondary, namely, the secondary windings 137 and 157.

The magnetic amplifier 123 has a main winding 127 connected in series with the saturating rectifier 129, and a second main winding 131 connected in series with the saturating rectifier 133. The series circuits of the main windings 127 and 131 are connected in parallel with each other, and the saturating rectifiers 129 and 133 are poled such that the main windings will conduct on alternate half cycles when supplied from an alternating current source. One common terminal 135 of the parallel connected main windings 127 and 131 is connected to one side of one group of secondary windings 137 of the transformer T3, the other common terminal 139 is connected to an input terminal of a set of rectifiers 141 connected in full-wave bridge arrangement. The opposite input terminal of the rectifiers 141 is connected to the opposite side of the secondary winding 137 of the transformer T3. The magnetic amplifier 123 is provided with biasing windings 143 connected to a suitable direct current source for the purpose of determining the point of operation of the magnetic amplifier 123. Control windings 145 are provided for controlling the output of the magnetic amplifier in accordance with a controlled source.

The magnetic amplifier 125 is provided with a main winding 147 connected in series with a saturating rectifier 149 and a main winding 151 connected in series with a saturating rectifier 153. The circuits of the main windings 147 and 151 are connected in parallel, and the common terminal 155 is connected to one side of the group of secondary windings 157 of the transformer T3. The other common terminal 159 is connected to one input terminal of a set of rectifiers 161 connected in full bridge arrangement, and the opposite input terminal of the rectifiers 161 is connected to the opposite side of the secondary winding 157 of the transformer T3. The magnetic amplifier 125 has biasing windings 163 connected to a suitable direct current source for determining the point of operation of the magnetic amplifier 125 and control windings 165 to control the output of the magnetic amplifier in accordance with the control signal applied thereto. Mixing resistor 167 is connected across the output terminals of the set of rectifiers 141 in full wave bridge arrangement, and mixing resistor 169 is connected across the output terminals of the set of rectifiers 161 in full wave bridge arrangement. The resistors 167 and 169 are connected such that the voltage which appears across the combination of the two resistors 167 and 169 is the difference of the voltage output from magnetic amplifiers 123 and 125.

The control windings 145 of the magnetic amplifier 123, and 165 of the magnetic amplifier 125 are connected in series with each other and across the secondary winding S3 of the transformer T2. Thus, the inertia compensating control signal is applied to the control windings 145 and 165.

With the connections described, the magnetic amplifiers 123 and 125 are set to operate at approximately the midpoint of their characteristics, and the control windings 145 and 165 are wound on their cores in such a manner that a current, which will cause an increase of saturation in the core of the magnetic amplifier 123, will cause a desaturation of the core of the magnetic amplifier 125 and vice versa. It will also be understood that with this arrangement, the resultant output of the two magnetic amplifiers is reversible. For example, if the system is accelerated, a signal will appear across the secondary winding S3 of the transformer T2, and the magnitude of the signal will be dependent upon the inertia necessary to accelerate the system. A current then flows through the control windings 145 and 165 in the direction shown which increases the saturation of the magnetic amplifier 123 and decreases the saturation of the magnetic amplifier 125, which gives a resultant voltage across the combination of resistors 167 and 169, which has a polarity as indicated, and of a magnitude determined by the inertia to be compensated for. The field winding 83 of the booster generator B which is connected directly across the resultant output of the two magnetic amplifiers 123 and 125 and, thus, the overall excitation of the booster generator B is decreased by an amount such that it will supply a voltage equal to the IR drop in the circuit of the armature of the unwind braking generator BG. The inertia compensating control winding 113 of the magnetic amplifier 91 is also connected to receive the resultant voltage across the combination of resistors 167 and 169. For a polarity as shown, the current will flow through the inertia compensating control winding 113 in such a direction as to cause the cores to desaturate and, thus, reduce the excitation of the field winding 87 of the unwind braking generator and reduce the current of the unwind braking generator BG during acceleration of the system by the proper amount to allow the system to accelerate with a constant tension of the strip of material M. Of course, when there is no inertia compensating signal on the secondary winding S3 of the transformer T2, the resultant voltage across the combination of resistors 167 and 169 is zero.

If the system is to be decelerated and the tap 51 on the speed reference voltage potentiometer 53 moved accordingly, the inertia compensating signal across the secondary winding S3 of the transformer T2 will cause a current to flow through the control windings 145 and 165 of the magnetic amplifiers 123 and 125, respectively, in a direction which is opposite to the one shown. The cores of the magnetic amplifier 123 will be desaturated, and the cores of the magnetic amplifier 125 will move toward saturation, and the resultant voltage across the combination of resistors 167 and 169 will have the opposite polarity to that which is shown. Thus, the field winding 83 will be energized in such a direction as to increase the resultant excitation of the booster generator B by the proper amount to supply the circuit of the armature of the unwind braking generator BG with a voltage equal to the IR drop in that circuit. The current which will flow through the inertia compensating control winding 113 of the magnetic amplifier 91, due to the resultant voltage across the mixing resistors 167 and 169, will be in such a direction as to saturate the cores and increase the output of the magnetic amplifier 91 by the proper amount. This will increase the excitation of the field winding 87 of the unwind braking generator BG to increase the current of the unwind braking generator and also increase its braking effect on the unwind reel by that amount which is necessary to maintain a constant tension in the strip of material M.

Figure 2:
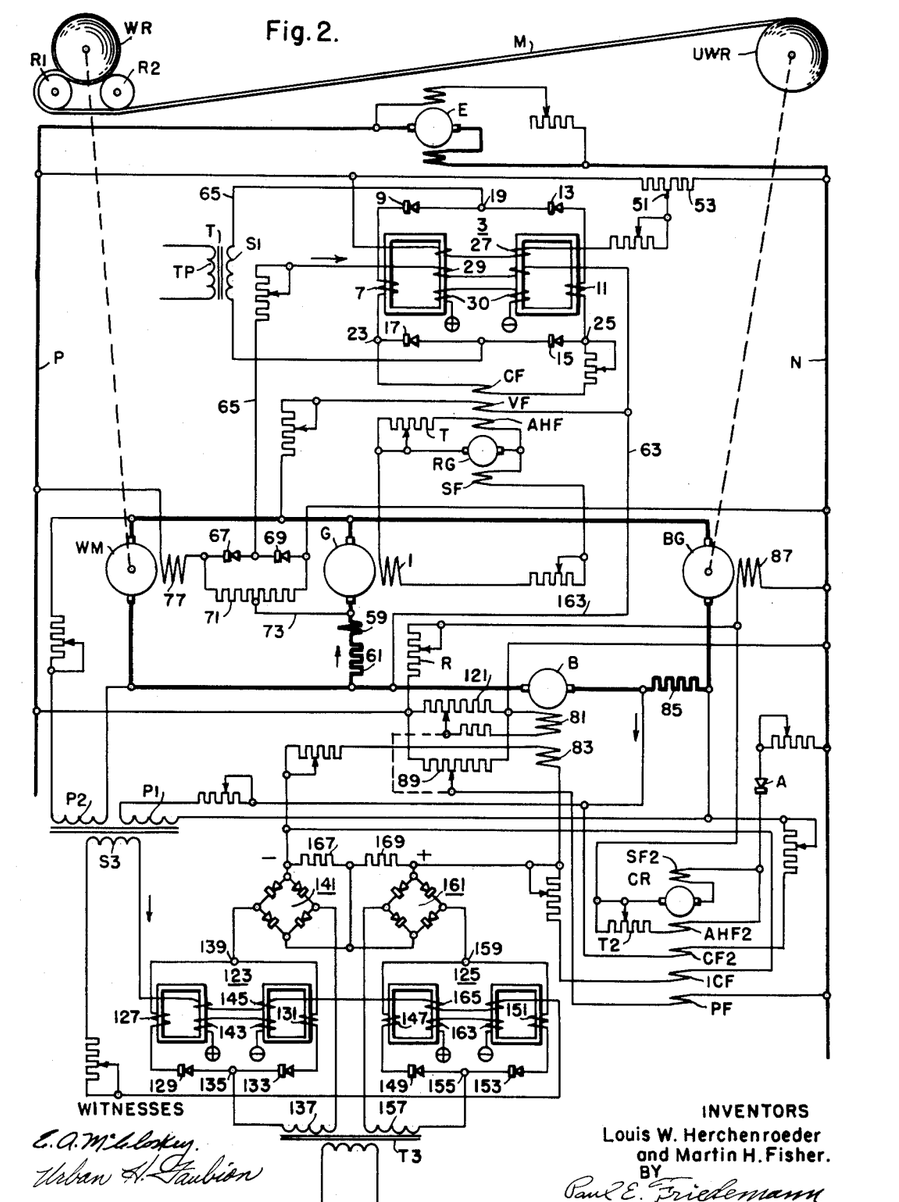

Fig. 2 shows an embodiment of the invention wherein regulating generators RG and CR are used in place of the magnetic amplifiers 5 and 91 respectively of the circuit of Fig. 1. The rest of the components of Fig. 2 are the same as those shown in Fig. 1 and are numbered accordingly. The circuit components which are common to both Fig. 1 and Fig. 2 are connected in the same manner in Fig. 2 as is shown for Fig. 1 and operate in the same manner as described with the exception of the circuit of the field winding 87 of the unwind braking generator BG.

The regulating generator RG supplies the main generator G with its energizing voltage and has a self-energizing field winding SF, an anti-hunt field winding AHF, a voltage field winding VF and a current field CF. The anti-hunt field winding AHF is connected in series with the tuning resistor T across the output terminals of the armature of the regulating generator RG and in parallel with the series combination of the self-energizing field winding SF and the field winding 1 of the main generator G. The tuning resistor T is adjusted so that under steady state conditions the ampere turns of the anti-hunt field winding AHF are less than the ampere turns of the self-energizing field winding SF. These windings are connected in opposition and the difference in ampere turns is such that the generated voltage of the regulating generator is at a value along the air gap line so that the other field windings are only called upon to provide a slight additional net field, either additive or subtractive, to shift the armature voltage of the regulating generator RG a relatively large amount. Thus, the regulating generator RG operates as a sensitive amplifier of a high amplification ratio. Because of the inductance of the field winding 1 of the main generator G, the time constant of the anti-hunt field winding AHF is very much less than the time constant of the self-energizing field winding circuit. As a result of this difference in time constants, the anti-hunt field winding AHF rapidly follows any change in output voltage and acting in advance of the self-energizing field winding SF opposes any sudden change in the output voltage of the regulating generator RG.

The regulating generator RG has its voltage field winding VF connected to receive the voltage of the main generator and thus regulate the output in accordance therewith. That is, the voltage field winding VF is wound in such a way as to decrease the net excitation of the regulating generator RG when the voltage of the main generator G increases and allow the net excitation to be increased when the voltage of the main generator G decreases. This action regulates the voltage of the main generator.

The current field winding CF is energized from the output of the magnetic amplifier 3. The current field winding CF then is responsive to the current limit signal so that the same current limit action is achieved both on acceleration and deceleration of the system as was described for the circuit of Fig. 1.

The regulating generator CR has an anti-hunt field winding AHF2 connected in series with a tuning resistor T2 across its output terminals. The anti-hunt field AHF2 and tuning resistor T2 are effectively connected in parallel with the field winding 87 of the unwind braking generator BG and the self-energizing field winding SF2 of the regulating generator CR. Like the regulating generator RG, the regulating generator CR has its load circuits adjusted so that it operates substantially along its air gap line.

The regulating generator CR also has a pattern field winding PF, a current regulating field winding CF2, and an inertia compensating field winding 1CR. The pattern field winding PF is energized from the tension adjusting rheostat 89 to set the point of operation of the regulating generator on its air gap line and consequently the energization of the field 87 of the unwind braking generator BG.

The current regulating field winding CF2 is energized with the voltage across the resistor 85 in the circuit of the armature of the braking generator BG and is therefore responsive to the current in that circuit. The current regulating field winding CF2 is wound so as to decrease the net excitation of the regulating generator CR for an increase of current in the armature circuit of the braking generator BG and vice versa. This action regulates the excitation of the field winding 87 of the braking generator BG and thus regulates the current in the circuit of the armature of the braking generator BG.

The inertia compensation field winding 1CF receives its inertia compensation signal from across the mixing resistors 167 and 169. The inertia compensating field windings are wound in such a way as to decrease the net excitation of the regulating generator CR for a voltage across the mixing resistors 167 and 169 of the polarity shown and increases the net excitation for a voltage of a polarity opposite the one shown. Thus if the system is accelerated the braking effect of the braking generator BG will be reduced by the proper amount to allow the system to accelerate while maintaining a constant strip tension and similarly the braking will be increased by the proper amount upon deceleration of the system to maintain the constant strip tension.

The field winding 87 of the unwind braking generator BG is connected in a series circuit from positive lead P through the tapped resistor R, and field winding 87 to the negative lead N. The tapped resistor R is of such a value that the field winding 87 will always have a selected minimum excitation and consequently there will always be some braking action by the unwind braking generator even if there should be a failure of the voltage supplied by the regulating generator CR. Under most conditions, the regulating generator CR will supply the field winding 87 of the unwind braking generator BG with an excitation which is greater than the minimum excitation supplied from the positive and negative leads P and N through the tapped resistor R. Since, however, the output of regulating generators such as the one utilized here are capable of reversal, a rectifier A is utilized in series with the armature of the regulating generator CR which is of such a polarity as to block any current flow from the rotating regulator which is reverse with respect to the normal output. Therefore, a reverse voltage output from the rotating regulator CR will not reduce the minimum excitation supplied to the field winding 87 of the unwind braking generator BG.

From the foregoing discussion, it will be appreciated that the objects of the invention have been accomplished by providing a system with current limit on acceleration and deceleration and providing means for supplying the proper inertia compensation while accelerating or decelerating the system.

While but one embodiment of the invention has been shown, it is to be understood that the invention is capable of various adaptations and applications and that changes and modifications may be made which all come within the spirit of the invention.

We claim as our invention:

1. In a system of control for dynamoelectric machines, in combination, a main generator having an armature winding and a field winding, a motor connected to the main generator to be operated in accordance with the voltage of said main generator, a self-saturating magnetic amplifier having main windings connected to energize the generator field winding and having a biasing means and a control winding, and magnetic amplifier means responsive to the generator armature current and a reference voltage, connected to energize the control winding of the self-saturating magnetic amplifier to control the excitation of the generator field winding.

2. In a system of control for dynamoelectric machines, in combination, a main generator having an armature winding and a field winding, a motor connected to the main generator to be operated in accordance with the voltage of said main generator, a self-saturating magnetic amplifier having main windings connected to energize the generator field winding and having a biasing means and a control winding, and magnetic amplifier means responsive to the generator armature current above a preselected value and a reference voltage, connected to energize the control winding of the self-saturating magnetic amplifier to control the excitation of the generator field winding.

3. In a control system for an electrical drive system, a motor, a main generator connected to supply the armature voltage for said motor, excitation means for said main generator, saturable core reactor means connected to control the excitation of the excitation means for the main generator, a first control means for said saturable core reactor means responsive to a reference voltage, a second control means for said saturable core reactor means, first impedance means connected to have a voltage drop across it proportional to the armature current of said main generator, a second impedance means having preselected voltage drop across it, one end of said first impedance means being connected to the mid-point of said second impedance means, a first and a second unidirectional conducting device connected in series with each other and poled the same with respect to each other connected around said second impedance means said first and second unidirectional conducting devices being poled in such a direction as to oppose current flow due to the voltage drop across said second control means having one end connected to a point between said first and second unidirectional conducting devices, the opposite end of said second control means being connected to the end of said first impedance opposite the end which is connected to the mid-point of said second impedance.

4. In a control system for an electrical drive system, a motor, a main generator connected to supply the armature voltage for said motor, excitation means for said main generator, a first and a second saturable core reactor means, said second saturable core reactor means being connected to supply the excitation of the excitation means for the main generator, a control means for said second saturable core reactor means connected to receive the output of said first saturable core reactor means, a first control means for said first saturable core impedance means responsive to a reference voltage, a second control means for said first saturable core reactor means, first impedance means connected to have a voltage drop across it proportional to the armature current of said main generator, a second impedance means having preselected voltage drop across it, one end of said first impedance means being connected to the mid-point of said second impedance means, a first and a second unidirectional conducting device connected in series with each other and poled the same with respect to each other connected around said second impedance means, said first and second unidirectional conducting devices being poled in such a direction as to oppose current flow due to the voltage drop across said second impedance said second control means having one end connected to a point between said first and second unidirectional conducting devices, the opposite end of said second control means being connected to the end of said first impedance opposite the end which is connected to the mid-point of said second impedance.

5. A system for an electric reel drive comprising a motor, a main generator connected in a loop circuit with said motor for supplying it with driving energization, a braking generator connected in shunt with said motor and said main generator, the speed of said braking generator being in part a function of the inertia of the motor and its load, a current regulator for said braking generator, energization means for said unwind braking generator, a transformer means having a first set of primary windings, a second set of primary windings, and a set of secondary windings; said first set of primary windings being connected in said loop circuit to receive a voltage proportional to the voltage changes in the loop circuit, said second set of primary windings being connected to be energized in accordance with the current changes in the armature circuit of said unwind braking generator, inertia compensating saturable core reactor means connected to determine the energization of the energization means for said unwind braking generator, control means for said saturable core impedance device, said control means being connected to be energized in accordance with the voltage across the secondary windings of said transformer means.

6. A system for an electric reel drive comprising a motor, a main generator connected in a loop circuit with said motor for supplying it with driving energization, a braking generator connected in shunt with said motor and said main generator, the speed of said braking generator being in part a function of the inertia of the motor and its load, a current regulator for said braking generator, energization means for said unwind braking generator, a transformer means having a first set of primary windings, a second set of primary windings, and a set of secondary windings; said first set of primary windings being connected to the loop circuit to receive a voltage proportional to the change of voltage in the loop circuit, said second set of primary windings being connected to be energized in accordance with the current change in the armature circuit of said unwind braking generator, a first magnetic amplifier regulating means, control means for said first magnetic amplifier means, said control means being connected to be energized in accordance with the voltage across the secondary windings of said transformer means to control the output of said first magnetic amplifier regulating means in accordance therewith, a second regulating means having first, second, and third control means, said first control means connected to be energized in accordance with a tension reference voltage, said second control means connected to be energized in accordance with the current in the armature circuit of said unwind braking generator, said third control means connected to be energized in accordance with the output of said first magnetic amplifier regulating means, said energization means for said unwind braking generator being connected to receive the output of said second regulating means.

7. A system for an electric reel drive comprising a motor, a main generator connected in a loop circuit with said motor for supplying it with driving energization, a braking generator connected in shunt with said motor and said main generator, the speed of said braking generator being in part a function of the inertia of the motor and its load, a current regulator for said braking generator, energization means for said unwind braking generator, a transformer means having a first set of primary windings, a second set of primary windings, and a set of secondary windings; said first set of primary windings being connected to the loop circuit to receive a voltage proportional to the unwind braking generator voltage, said second set of primary windings being connected to be energized in accordance with the current changes in the armature circuit of said unwind braking generator, a first magnetic amplifier regulating means, control means for said first magnetic amplifier means, said control means being connected to be energized in accordance with the voltage across the secondary windings of said transformer means to control the output of said first magnetic amplifier regulating means in accordance therewith, a second regulating magnetic amplifier means having first, second, and third control means, said first control means connected to be energized in accordance with a tension reference voltage, said second control means connected to be energized in accordance with the current in the armature circuit of said unwind braking generator, said third control means connected to be energized in accordance with the output of said first magnetic amplifier regulating means, said energization means for said unwind braking generator being connected to receive the output of said second regulating magnetic amplifier means.

8. A system for an electric reel drive comprising a motor, a main generator connected in a loop circuit with said motor for supplying it with driving energization, an unwind braking generator connected in shunt with said motor and said main generator, the speed of said braking generator being in part a function of the inertia of the motor and its load, a booster generator in series with said braking generator to supply a voltage equal to the IR drop in the unwind braking generator armature circuit, braking generator excitation means, and booster generator excitation means, a current regulator for said unwind braking generator, means responsive to a change of unwind braking generator armature voltage and armature current to change the output of the current regulator for said unwind braking generator accordingly.

9. A system for an electric reel drive comprising a motor, a main generator connected in a loop circuit with said motor for supplying it with driving energization, an unwind braking generator connected in shunt with said motor and said main generator, the speed of said braking generator being in part a function of the inertia of the motor and its load, a booster generator in series with said braking generator to supply a voltage equal to the IR drop in the unwind braking generator armature circuit, braking generator excitation means, and booster generator excitation means, a current regulator for said unwind braking generator, means responsive to a change of unwind braking generator armature voltage and armature current to change the output of the current regulator for said unwind braking generator, the energization of the unwind braking generator, and the energization of the booster generator accordingly.

10. A system for an electric reel drive comprising a motor, a main generator connected in a loop circuit with said motor for supplying it with driving energization, an unwind braking generator connected in shunt with said motor and said main generator, the speed of said braking generator being in part a function of the inertia of the motor and its load, a booster generator in series with said braking generator to supply a voltage equal to the IR drop in the unwind braking generator armature circuit, braking generator excitation means, and booster generator excitation means, a current regulator for said unwind braking generator, a transformer means having a first set of primary windings, a second set of primary windings, and a set of secondary windings, said first set of primary windings being connected to the loop circuit to receive a voltage proportional to the voltage changes in the loop circuit, said second set of primary windings being connected to be energized in accordance with the current changes in the armature circuit of said unwind braking generator, inertia compensating saturable core reactor means connected to determine the energization of the energization means for said unwind braking generator and said booster generator, control means for said saturable core impedance device, said control means being connected to be energized in accordance with the voltage across the secondary windings of said transformer means.

11. A system for an electric reel drive comprising a motor, a main generator connected in a loop circuit with said motor for supplying it with driving energization, an unwind braking generator connected in shunt with said motor and said main generator, the speed of said braking generator being a function of the inertia of the motor and its load, a booster generator in series with said braking generator to supply a voltage equal to the IR drop in the unwind braking generator armature circuit, braking generator excitation means, and booster generator excitation means, a current regulator for said unwind braking generator, a transformer means having a first set of primary windings, a second set of primary windings, and a set of secondary windings, said first set of primary windings being connected to the loop circuit to receive a voltage proportional to the voltage changes in the loop circuit, said second set of primary windings being connected to be energized in accordance with the current changes in the armature circuit of said unwind braking generator, a first regulating means comprising a magnetic amplifier, control means for said first regulating means, said control means being connected to be energized in accordance with the voltage across the set of secondary windings of said transformer means to control the output of said first regulating means in accordance therewith, a second regulating means having first, second, and third control means, said first control means connected to be energized in accordance with a tension reference voltage, said second control means connected to be energized in accordance with the current in the armature circuit of said unwind braking generator, said third control means connected to be energized in accordance with the output of said first regulating means, said energization means for said unwind braking generator and said energization means for said booster generator being connected to receive a signal from said second regulating means.

12. A system for an electric reel drive comprising a motor, a main generator connected in a loop circuit with said motor for supplying it with driving energization, an unwind braking generator connected in shunt with said motor and said main generator, the speed of said braking generator being a function of the inertia of the motor and its load, a booster generator in series with said braking generator to supply a voltage equal to the IR drop in the unwind braking generator armature circuit, braking generator excitation means, and booster generator excitation means, a current regulator for said unwind braking generator, a transformer means having a first set of primary windings, a second set of primary windings, and a set of secondary windings, said first set of primary windings being connected to the loop circuit to receive a voltage proportional to the voltage changes in the loop circuit, said second set of primary windings being connected to be energized in accordance with the current changes in the armature circuit of said unwind braking generator, a first regulating means comprising a magnetic amplifier, control means for said first regulating means, said control means being connected to be energized in accordance with the voltage across the set of secondary windings of said transformer means to control the output of said first regulating means in accordance therewith, a second regulating means comprising magnetic amplifier means and having first, second, and third control means, said first control means connected to be energized in accordance with a tension reference voltage, said second control means connected to be energized in accordance with the current in the armature circuit of said unwind braking generator, said third control means connected to be energized in accordance with the output of said first regulating means, said energization means for said unwind braking generator and said energization means for said booster generator being connected to receive a signal from said second regulating means.

13. In a system of control for dynamoelectric machines, in combination, a main generator having an armature winding and a field winding, a motor connected to the main generator to be operated in accordance with the voltage of said main generator, a braking generator connected in shunt with said motor and said main generator, the speed of said braking generator being a function of the motor and its load, a self-saturating magnetic amplifier connected to energize the generator field winding having a biasing means and a control winding, and magnetic amplifier means responsive to the main generator armature current and a reference voltage connected to energize the control winding of the self-saturating magnetic amplifier, current regulator means for said braking generator, means responsive to a change of braking generator armature voltage and current to change the calibration of the current regulator for said braking generator accordingly.

14. In a control system for an electrical drive system, a motor, a main generator connected to supply the armature voltage for said motor, excitation means for said main generator, saturable core reactor means connected to control the excitation of the excitation means for the main generator, a first control means for said saturable core reactor means responsive to a reference voltage, a second control means for said saturable core reactor means, first impedance means connected to have a voltage drop across it proportional to the armature current of said main generator, a second impedance means having preselected voltage drop across it, one end of said first impedance means being connected to the mid-point of said second impedance means, a first and a second unidirectional conducting device connected in series with each other and poled the same with respect to each other connected around said second impedance means said first and second unidirectional conducting devices being poled in such a direction as to oppose current flow due to the voltage drop across said second control means having one end connected to a point between said first and second unidirectional conducting devices, the opposite end of said second control means being connected to the end of said first impedance opposite the end which is connected to the mid-point of said second impedance, a braking generator connected in shunt with said motor and said main generator, the speed of said braking generator being in part a function of the inertia of the motor and its load, a current regulator for said braking generator, means responsive to a change of braking generator armature voltage and current to change the output of the current regulator for said braking generator accordingly.

15. In a control system for an electrical drive system, a motor, a main generator connected to supply the armature voltage for said motor, excitation means for said main generator, a first and a second saturable core reactor means, said second saturable core reactor means being connected to supply the excitation of the excitation means for the main generator, a control means for said second saturable core reactor means connected to receive the output of said first saturable core reactor means, a first control means for said first saturable core impedance means responsive to a reference voltage, a second control means for said first saturable core reactor means, first impedance means connected to have a voltage drop across it proportional to the armature current of said main generator, a second impedance means having preselected voltage drop across it, one end of said first impedance means being connected to the mid-point of said second impedance means, a first and a second unidirectional conducting device connected in series with each other and poled the same with respect to each other connected around said second impedance means, said first and second unidirectional conducting devices being poled in such a direction as to oppose current flow due to the voltage drop across said second impedance said second control means having one end connected to a point between said first and second unidirectional conducting devices, the opposite end of said second control means being connected to the end of said first impedance opposite the end which is connected to the mid-point of said second impedance, a braking generator connected in shunt with said motor and said main generator, the speed of said braking generator being a function of the inertia of the motor and its load, a current regulator for said braking generator, energization means for said unwind braking generator, a transformer means having a first set of primary windings, a second set of primary windings, and a set of secondary windings; said first set of primary windings being connected to the loop circuit to receive a voltage proportional to the voltage changes in the loop circuit, said second set of primary windings being connected to be energized in accordance with the current changes in the armature circuit of said unwind braking generator, inertia compensating saturable core reactor means connected to determine the energization of the energization means for said unwind braking generator, control means for said saturable core impedance device, said control means being connected to be energized in accordance with the voltage across the secondary windings of said transformer means.

16. A system for an electric reel drive comprising a motor, a main generator connected in a loop circuit with said motor for supplying it with driving energization, an unwind braking generator connected in shunt with said motor and said main generator, the speed of said braking generator being in part a function of the inertia of the motor and its load, a booster generator in series with said braking generator to supply a voltage equal to the IR drop in the unwind braking generator armature circuit, braking generator excitation means, and booster generator excitation means, a current regulator for said unwind braking generator, means responsive to a change of unwind braking generator armature voltage and armature current to change the output of the current regulator for said unwind braking generator accordingly, a field winding for said main generator, a self-saturating magnetic amplifier having main windings connected to energize the main generator field windings and having biasing means and a control winding, and magnetic amplifier means responsive to the main generator armature current and a reference voltage, connected to energize the control winding of the self-saturating magnetic amplifier to control the excitation of the generator field winding.

17. A system for an electric reel drive comprising a motor, a main generator connected in a loop circuit with said motor for supplying it with driving energization, an unwind braking generator connected in shunt with said motor and said main generator, the speed of said braking generator being a function of the inertia of the motor and its load, a booster generator in series with said braking generator to supply a voltage equal to the IR drop in the unwind braking generator armature circuit, braking generator excitation means, and booster generator excitation means, a current regulator for said unwind braking generator, a transformer means having a first set of primary windings, a second set of primary windings, and a set of secondary windings, said first set of primary windings being connected to the loop circuit to receive a voltage proportional to the voltage changes in the loop circuit, said second set of primary windings being connected to be energized in accordance with the current changes in the armature circuit of said unwind braking generator, inertia compensating saturable core reactor means connected to determine the energization of the energization means for said unwind braking generator and said booster generator, control means for said saturable core impedance device, said control means being connected to be energized in accordance with the voltage across the secondary windings of said transformer means, a field winding for said main generator, a self-saturating magnetic amplifier having main windings connected to energize the main generator field windings and having biasing means and a control winding, and magnetic amplifier means responsive to the main generator armature current and a speed reference voltage, connected to energize the control winding of the self-saturating magnetic amplifier to control the excitation of the generator field winding.

18. In a system of control for dynamoelectric machines, in combination, a main generator having an armature and a field winding, a motor connected to the main generator to be operated in accordance with the voltage of said main generator, a rotating regulator having excitation means, and saturable core impedance means responsive to the generator armature current above a preselected value and a reference voltage connected to control the excitation means of the rotating regulator to control the excitation of the generator field winding.

19. In a system of control for dynamoelectric machines, in combination, a main generator having an armature and a field winding, a motor connected to the main generator to be operated in accordance with the voltage of said main generator, a regulating generator and a saturable core impedance means, said regulating generator being connected to supply the energization of the excitation means for the main generator, excitation means for said regulating generator connected to be energized by the output of said saturable core impedance means, a first control means for said saturable core impedance means responsive to a reference voltage, a second control means for said saturable core impedance means, first impedance means connected to have a voltage drop across it proportional to the armature current of said main generator, a second impedance means having preselected voltage drop across it, one end of said first impedance means being connected to the mid-point of said second impedance means, a first and a second unidirectional conducting device connected in series with each other and poled the same with respect to each other connected around said second impedance means, said first and second unidirectional conducting devices being poled in such a direction as to oppose current flow due to the voltage drop across said second impedance, said second control means having one end connected to a point between said first and second unidirectional conducting devices, the opposite end of said second control means being connected to the end of said first impedance means opposite the end which is connected to the mid-point of said second impedance.

20. A system for an electric reel drive comprising a motor, a main generator connected in a loop circuit with said motor for supplying it with driving energization, a braking generator connected in shunt with said motor and said main generator, the speed of said braking generator being in part a function of the inertia of the motor and its load, energization means for said unwind braking generator, a transformer means having a first set of primary windings, a second set of primary windings, and a set of secondary windings; said first set of primary windings being connected to the loop circuit to receive a voltage proportional to the voltage changes in the loop circuit, said second set of primary windings being connected to be energized in accordance with the current changes in the armature circuit of said unwind braking generator, inertia compensating means comprising an inertia compensating saturable core impedance device and an inertia compensating regulating generator, said inertia compensating regulating generator connected to determine the excitation of the energization means for said unwind braking generator, first excitation means for said inertia compensating regulating generator connected to be energized by said inertia compensating saturable core impedance device, control means for said inertia compensating saturable core impedance device, said control means being connected to be energized in accordance with the voltage across the secondary windings of said transformer means, second excitation means for said inertia compensating regulating generator connected to be responsive to the current in the circuit of said braking generator.

21. A system for an electric reel drive comprising a motor, a main generator connected in a loop circuit with said motor for supplying it with driving energization, an unwind braking generator connected in shunt with said motor and said main generator, the speed of said braking generator being in part a function of the inertia of the motor and its load, a booster generator in series with said braking generator to supply a voltage equal to the IR drop in the unwind braking generator armature circuit, braking generator excitation means, and booster generator excitation means, a current regulator for said unwind braking generator, a transformer means having a first set of primary windings, a second set of primary windings, and a set of secondary windings, said first set of primary windings being connected to the loop circuit to receive a voltage proportional to the voltage changes in the loop circuit, said second set of primary windings being connected to be energized in accordance with the current changes in the armature circuit of said unwind braking generator, a first regulating means comprising a magnetic amplifier, control means for said first regulating means, said control means being connected to be energized in accordance with the voltage across the set of secondary windings of said transformer means to control the output of said first regulating means in accordance therewith, a second regulating means having first, second, and third control means, said second regulating means comprising a rotating regulator, said first control means connected to be energized in accordance with a tension reference voltage, said second control means connected to be energized in accordance with the current in the armature circuit of said unwind braking generator, said third control means connected to be energized in accordance with the output of said first regulating means, said energization means for said unwind braking generator and said energization means for said booster generator being connected to receive a signal from said second regulating means.

22. A system for an electric reel drive comprising a motor, a main generator connected in a loop circuit with said motor for supplying it with driving energization, a braking generator connected in shunt with said motor and said main generator, the speed of said braking generator being in part a function of the inertia of the motor and its load, energization means for said unwind braking generator connected to be supplied with a selected minimum excitation, a transformer means having a first set of primary windings, a second set of primary windings, and a set of secondary windings; said first set of primary windings being connected to said loop circuit to receive a voltage proportional to the voltage changes in the loop circuit, said second set of primary windings being connected to be energized in accordance with the current changes in the armature circuit of said unwind braking generator, inertia compensating means comprising an inertia compensating saturable core impedance device and an inertia compensating regulating generator, said inertia compensating regulating generator being connected to regulate the excitation of the energization means for said unwind braking generator and having a blocking rectifier in series with the armature to insure the proper polarity of excitation across the energization means for said unwind braking generator, first excitation means for said inertia compensating regulating generator connected to be energized by said inertia compensating saturable core impedance device, control means for said inertia compensating saturable core impedance device, said control means being connected to be energized in accordance with the voltage across the secondary windings of said transformer means, second excitation means for said inertia compensating regulating generator connected to be responsive to the current in the circuit of said braking generator.

References Cited in the file of this patent

UNITED STATES PATENTS 2,308,993    Mickey ------------------ Jan. 19, 1943